United States Patent [19]
Okura et al.

[11] Patent Number: 4,826,384
[45] Date of Patent: May 2, 1989

[54] APPARATUS FOR STORING CHASSIS

[75] Inventors: Kazumasa Okura; Kazuo Saito, both of Yokohama, Japan

[73] Assignee: Mitsubishi Jukogyo Kabushiki Kaisha, Tokyo, Japan

[21] Appl. No.: 31,933

[22] Filed: Mar. 30, 1987

[30] Foreign Application Priority Data

Jul. 14, 1986 [JP] Japan .......................... 61-106712[U]
Oct. 14, 1986 [JP] Japan .......................... 61-156156[U]
Oct. 29, 1986 [JP] Japan .......................... 61-164990[U]

[51] Int. Cl.⁴ .............................................. B65G 1/02
[52] U.S. Cl. .................................... 414/234; 414/235;
414/233; 414/143.2; 414/331; 414/261; 410/50;
410/31; 410/43
[58] Field of Search .............. 414/331, 286, 234, 235,
414/239, 240, 249, 261, 96, 97, 126, 127, 233;
410/43, 31, 56, 82

[56] References Cited

U.S. PATENT DOCUMENTS

| | | | |
|---|---|---|---|
| 2,247,144 | 6/1941 | Baldwin | 414/139 |
| 2,247,146 | 6/1941 | Baldwin | 414/139 X |
| 2,687,222 | 8/1954 | Wahler | 414/261 X |
| 2,864,515 | 12/1958 | Marshall | 414/234 |
| 3,236,577 | 2/1966 | Anders et al. | 414/331 X |
| 3,294,260 | 12/1966 | Frangos | 414/261 X |
| 3,330,083 | 7/1967 | Joulmes | 414/233 X |
| 3,490,610 | 1/1970 | Czarnecki et al. | 414/35 |
| 4,549,663 | 10/1985 | Corbett, Jr. et al. | 211/13 |
| 4,611,962 | 9/1986 | Braly et al. | 410/57 |
| 4,650,381 | 3/1987 | Durkin | 410/43 |

FOREIGN PATENT DOCUMENTS

| | | |
|---|---|---|
| 57-23532 | 2/1982 | Japan . |
| 62-130908 | 6/1987 | Japan . |
| 540779 | 12/1976 | U.S.S.R. .......................... 414/331 |

Primary Examiner—Frank E. Werner
Attorney, Agent, or Firm—Wenderoth, Lind & Ponack

[57] ABSTRACT

An apparatus for storing a plurality of chassis in a vertically spaced relationship, which comprises a structure and a pallet support mechanism including a plurality of long guide members suspended from the structure via lifting and rotating mechanisms, includes a plurality of vertically spaced hooks attached to the structure and adapted to support pallets thereon, and a plurality of support elements arrranged in confronting relation to the hooks, the support elements being movable to and from the pallets supported on the hooks.

3 Claims, 4 Drawing Sheets

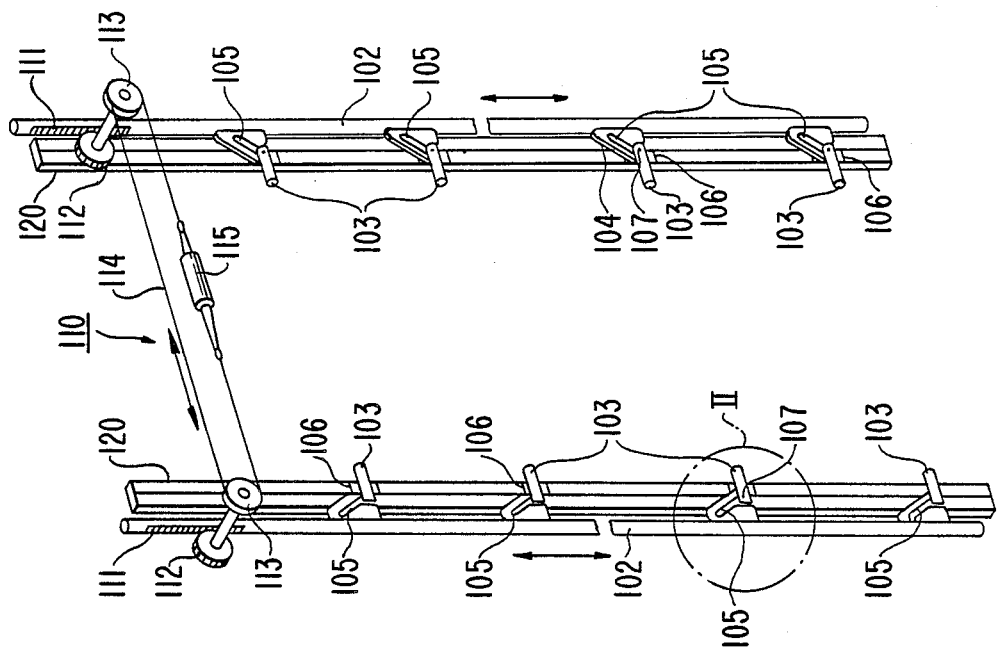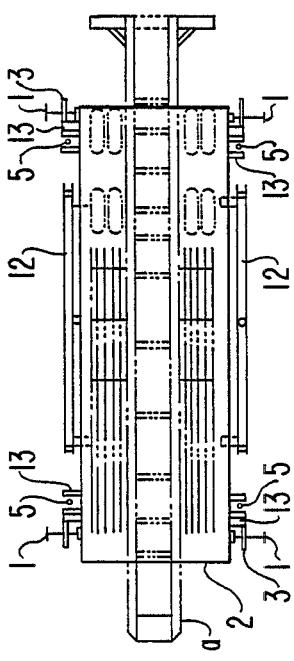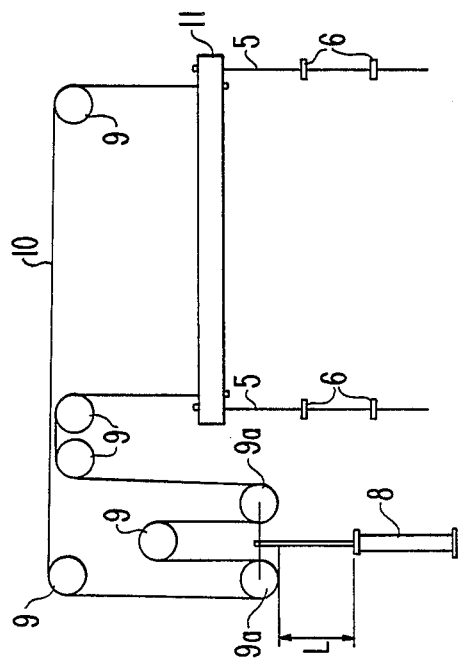

APPARATUS FOR STORING CHASSIS

BACKGROUND OF THE INVENTION

1. Field of the Invention

The present invention relates to an apparatus for storing a plurality of chassis such as trailer chassis in a vertically spaced relationship.

2. Description of the Related Art

In a harbor, a number of large containers are landed. These large containers are then placed on trailer chassis which are connected to a tractor. After the containers are conveyed by the tractor to a predetermined place, a forklift truck is used to lift and stack the containers therein on a temporary basis.

In this way, however, only few trailer chassis are able to be stacked, thus consuming a greater space. Especially in a city harbor, it is necessary to effectively utilize a limited space in an effort to stack a large number of containers.

SUMMARY OF THE INVENTION

Therefore, it is an object of the present invention to provide an apparatus for storing a plurality of chassis such as trailer chassis in a vertically spaced relationship, which provides a substantial saving in space.

It is another object of the invention to provide an apparatus for storing a plurality of chassis such as trailer chassis in a vertically spaced relationship, which enables easy and rapid storing of the pallets.

It is a further object of the invention to provide an apparatus for storing a plurality of chassis such as trailer chassis in a vertically spaced relationship, which enables easy maintenance and inspection.

According to the first invention, there is provided an apparatus for storing a plurality of chassis such as trailer chassis in a vertically spaced relationship, which comprises a structure and a pallet support mechanism including a plurality of long guide members suspended from the structure via lifting and rotating mechanisms, a plurality of vertically spaced hooks attached to the guide members and adapted to support pallets thereon, and a plurality of support elements arranged in confronting relation to the hooks, said elements being movable to and from the pallets supported on the hooks.

A cycle of operation is effected to subsequently lift the pallets and thus, to store them in a vertically spaced relationship. This results in a substantial saving in space as well as easy and rapid storing of a plurality of pallets. Such a cycle of operation generally includes inward movement of the support elements, downward movement and rotation of the long guide members and the hooks, outward movement of the support elements, and upward movement of the long guide members and the hooks. A reverse cycle of operation permits the pallets to move out of the structure.

According to the second invention, there is provided an apparatus for storing a plurality of chassis such as trailer chassis in a vertically spaced relationship according to the first invention, which comprises a structure and a pallet support mechanism, said pallet support mechanism including a plurality of columns, a plurality of operating bars extending adjacent to and along the plurality of columns, each operating bar having a plurality of inclined slots, a plurality of pallet support pins arranged in vertically spaced relation in each column and guided to project from and retreat into each column through the inclined slots of the operating bars, and a lifting/driving mechanism operatively associated with said plurality of operating bars.

Lateral movement of the pallet support pins is smoothly and securely effected in association with the operating bars and the inclined slots formed therein. This arrangement also provides a substantial support for the pallets, and thus, improves operability of the apparatus.

According to the third invention, there is provided an apparatus for storing a plurality of chassis such as trailer chassis according to the first invention, which comprises a frame assembly, a single drive unit placed in the frame assembly and adapted to move pallets in a vertical direction, and a plurality of sheaves arranged on four corners of the frame assembly and above the drive unit and adapted to guide a plurality of wires or chains for lifting said pallets, said wires or chains being connected to the drive unit.

Upon operation of the drive unit, a plurality of wires or chains are simultaneously moved to lift the pallets. In this embodiment, only one drive means is used and thus, maintenance and inspection are readily carried out.

BRIEF DESCRIPTION OF THE DRAWINGS

The above and further objects, aspects and advantages of the invention become apparent from the following description when taken in conjunction with the accompanying drawings, in which:

FIG. 3 is a transverse sectional view of the apparatus shown in FIG. 1;

FIG. 4 is a diagrammatic view showing a lifting mechanism;

FIG. 6 is a perspective view of a second embodiment of the present invention;

DESCRIPTION OF THE PREFERRED EMBODIMENTS

Figure 2:
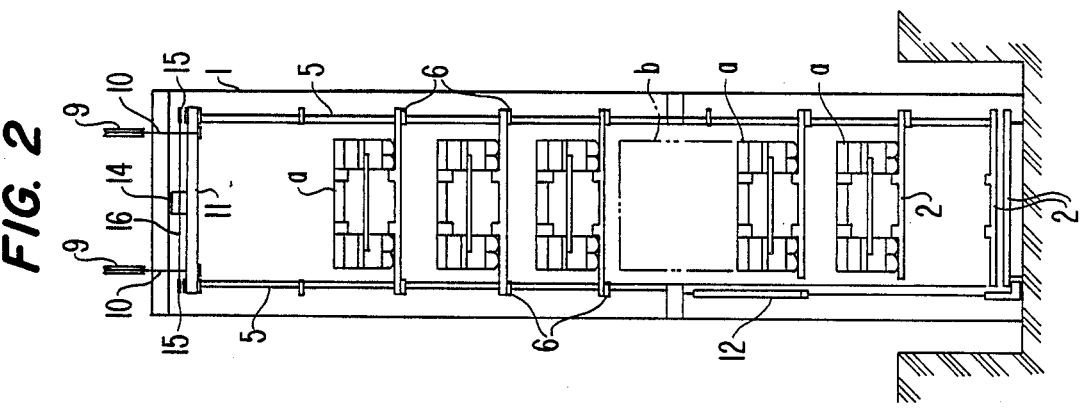
FIG. 2 is a side elevational view of the apparatus shown in FIG. 1.

FIGS. 1 through 4 illustrate a first embodiment of this invention. Reference numeral 1 designates a structure 1 and a pallet support mechanism. The pallet support mechanism includes a plurality of long guide members 5 suspended from the structure 1 via lifting and rotating mechanisms, hooks 6 attached in spaced relation to the guide members 5 and adapted to support pallets 2 thereon, and support elements 3 placed in adjacent relation to the hooks 6 and movable to and from the pallets 2.

Figure 1:
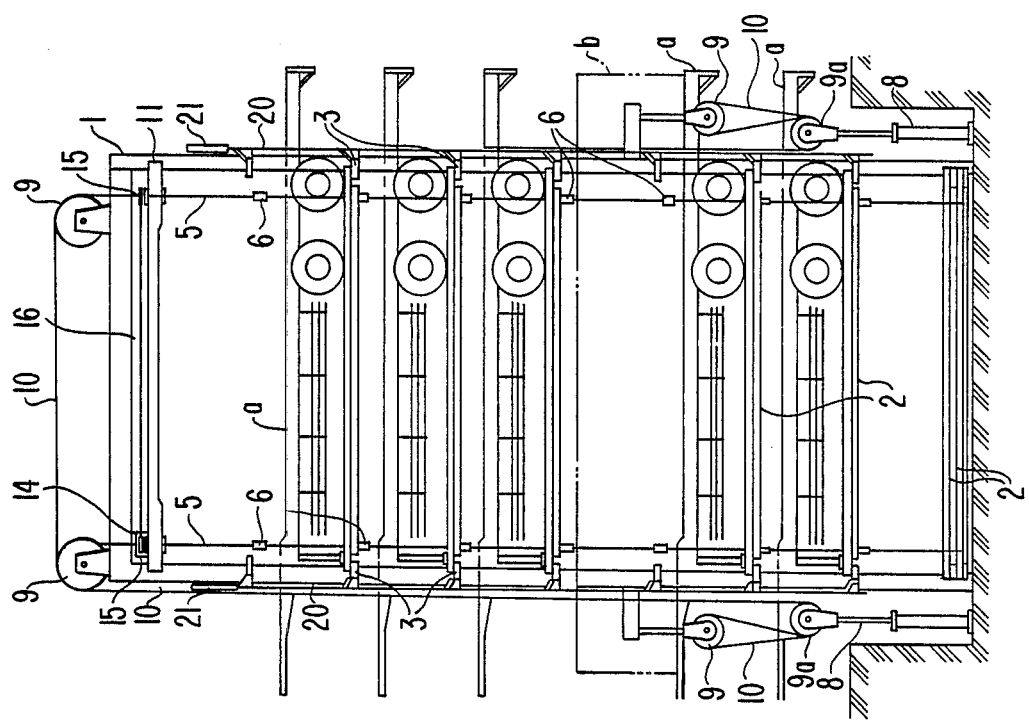
FIG. 1 is a front elevational view of an apparatus for storing a plurality of trailer chassis in a vertically spaced relationship, according to a first embodiment of the present invention.

Reference is made respectively to the lifting and rotating mechanisms in detail. As shown in FIGS. 1 and 4, the lifting mechanism includes lifters 8 such as hydraulic cylinders arranged near both lower sides of the structure 1, sheaves 9a, 9a vertically movable by the lifters 8, a wire 10 adapted to pass around a plurality of sheaves 9 as well as the sheaves 9a, and a lifting beam 11 to which opposite ends of the wire 10 are secured. The lifting beam 11 is suspended near the upper portion of the structure 1. The rotating mechanism includes four sprockets 15 placed on four corner of the lifting beam 11 respectively, a chain 16 trained around the sprockets 15, and a drive unit 14 to rotate the sprockets 15 through the chain 16. The guide members 5 are rotatably supported by the lifting beam 11 and fixed to the sprockets 15.

As shown in FIGS. 2 and 3, each pallet 2 has at its corners four receiving elements 13 through which the guide members 5 and the hooks 6 are insertable. When the guide members 5 are rotated 90°, the hooks 6 are brought into engagement with the underside of the receiving elements 13 to support the pallet 2.

Reference is now made to the pallet support mechanism in more detail. As best seen in FIG. 1, the support elements 3 are fixedly attached in spaced relation to four long support members 20 and are arranged in confronting relation to the hooks 6. When the support members 20 are rotated 90° by rotating means 21, the support elements 3 are moved under the four corners of the pallet 2.

As shown in FIGS. 2 and 3, lifting units, designated at 12, are arranged at the lower sides of the structure 1 and are adapted to move the pallet 2 up to the lowermost support element 3.

Figure 5A:
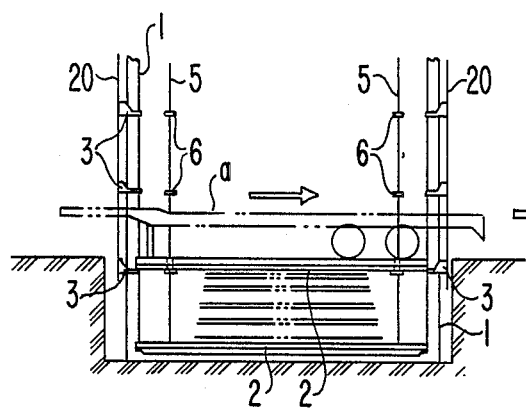
FIGS. 5(A) through 5(G) are diagrammatic views showing the manner in which trailer chassis are stored.

In operation, the pallet 2, placed in the lower portion of the structure 1, is lifted by the lifting units 12. The support members 20 are then rotated to move the support elements 3 under the pallet 2 for supporting purposes. The lifters 8 are operated to lift the sheaves 9a by a distance L whereby the lifting beam 11 is lowered to permit the guide members 5 and the lowermost hook 6 to be inserted into the receiving elements 13 on pallets 20. Thereafter, one of the sprockets 15 is rotatably driven by the drive unit 14 to thereby rotate the other sprockets 15 and the chain 16. This causes the guide members 5 and the hooks 6 to rotate and thus bring the hooks 6 into engagement with the receiving elements 13. Under these circumstances, a trailer chassis a is placed on the pallet 2 as shown in FIG. 5(A).

Figure 5B:
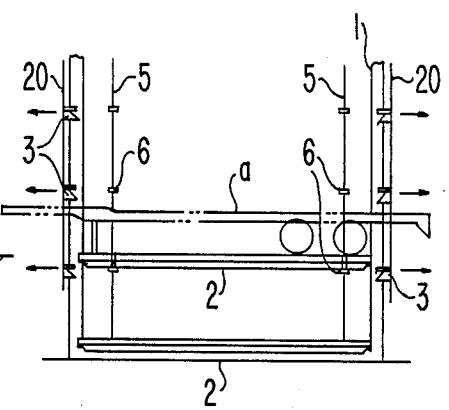
Figure 5C:
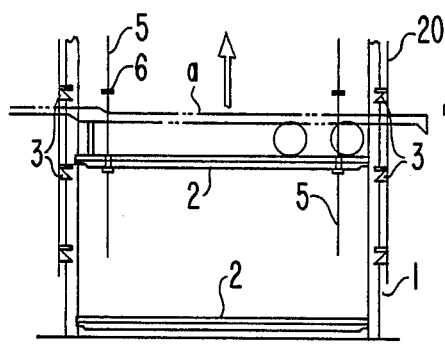
Figure 5D:
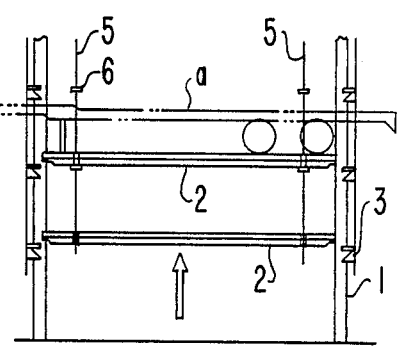
Figure 5E:
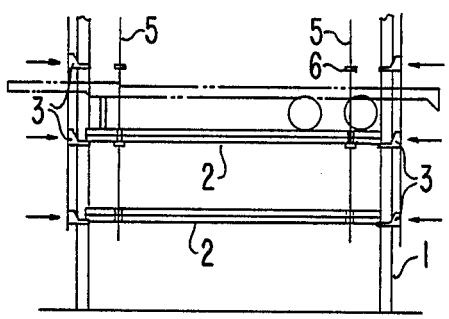
Figure 5F:
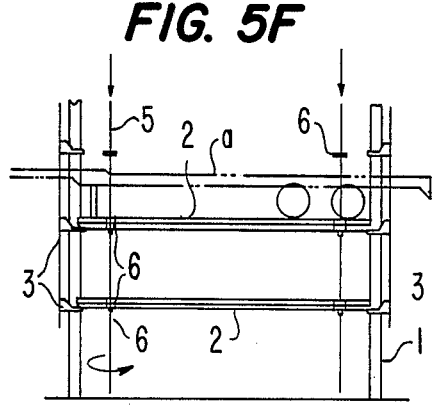
Figure 5G:
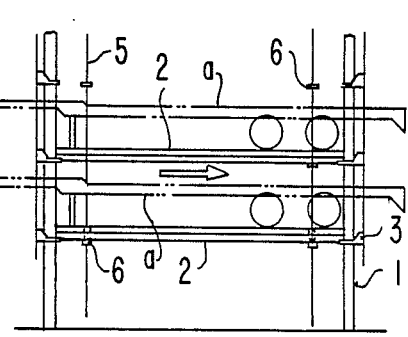

Next, the support members 20 are rotated o retreat the support elements 3 from the pallets 2 as shown in FIG. 5(B). The lifters 8 are again operated to lower the sheaves 9a by a distance L to raise the guide members 5 and thus, the pallet 2 and the trailer chassis a as shown in FIG. 5(C). The lifting units 12 are operated to further raise another pallet 2. Thereafter, the guide members 5 are inserted at respective lower ends into the pallet 2 and the support members 20 are rotated to move the support elements 3 under the pallet 2 as shown in FIGS. 5(D) and 5(E). The guide members 5 are then lowered and rotated as shown in FIG. 5(F). Following placement of another chassis a on the lower pallet 2 (See FIG. 5(G)), the lower pallet 2 and the chassis a are supported by the lowermost hook 6 and are raised. Under this cycle of operation, a number of trailer chassis a can be stored in the structure 1 in a vertically spaced relationship. It will be appreciated that if necessary, an empty container may be loaded on the chassis as shown in FIGS. 1 and 2.

A reverse cycle of operation permits the trailer chassis a to move out of the structure 1.

Figure 9:
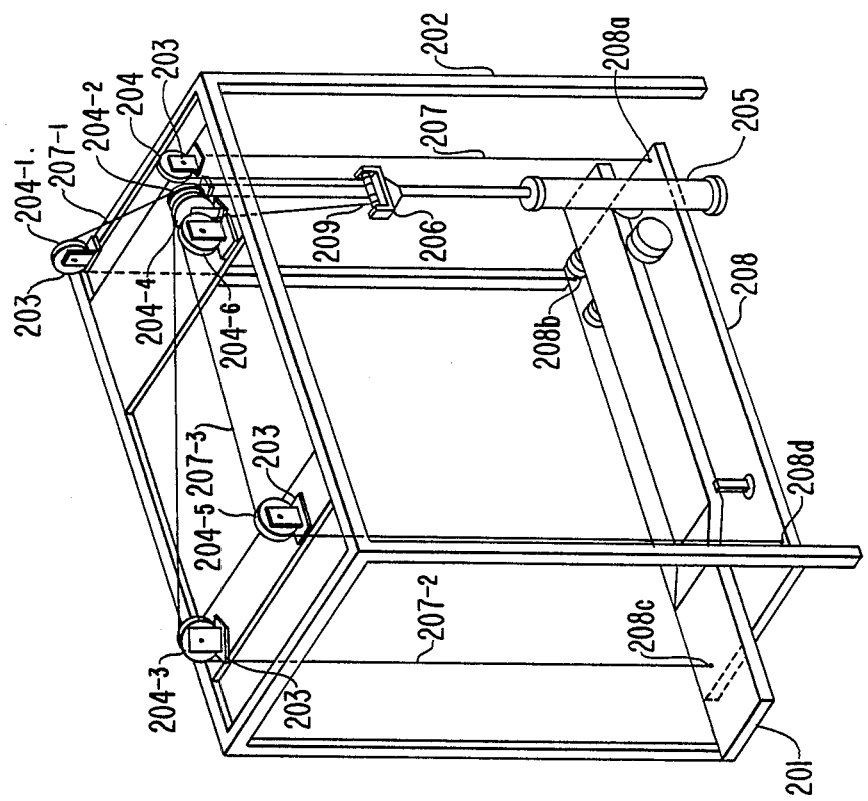
FIG. 9 is a perspective view of a third embodiment of the present invention.
Figure 7:
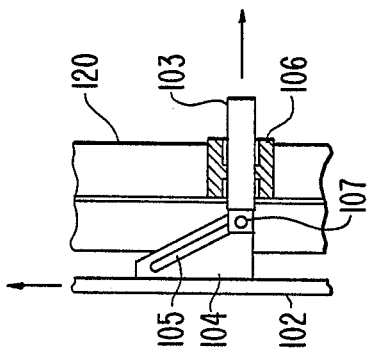
FIG. 7 is an enlarged side view of the second embodiment enclosed in a dot and dash line of FIG. 6.
Figure 8:
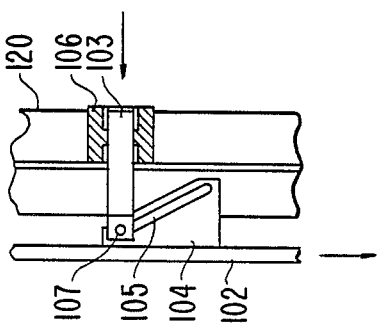
FIG. 8 is a view similar to FIG. 7, but showing the manner in which an operating bar is moved downwards to retreat a pin into a column.

FIGS. 6 through 8 illustrate a second embodiment of the invention directed particularly to a pallet support mechanism to be used in the above described apparatus for storing a plurality of chassis. FIG. 9 illustrates a third embodiment of the invention directed to a specific drive unit to be used in the above described apparatus for storing a plurality of chassis. Reference is now made only to different parts in the embodiments and therefore, similar parts will not be explained.

In FIGS. 6 to 8, reference numeral 120 designates a plurality of, but at least four columns (corresponding to the long support members 20 in the first embodiment shown in FIGS. 1 through 5) having a plurality of vertically spaced bosses 106 through which a plurality of pallet support pins 103 are guided. Operating bars 102 extend adjacent to and along the respective columns 120 and are movable therealong. Each operating bar 102 has a plurality of vertically spaced inclined slots 105 into which pins 107, fixed to the base ends of the pallet support pins 103, are loosely fitted. In this arrangement, vertical movement of the operating bars 102 causes the pins 107 to move along the inclined slots 105 and thus the pallet support pins 103 to project from and retreat into the columns 120 as best seen in FIGS. 7 and 8. The operating bars 102 are operatively associated with a lifting/driving mechanism 110 which will below be explained in more detail.

The lifting/driving mechanism 110 includes spur gears 111 formed on the upper portions of the operating bars 102, gears 112 adapted to mesh with the spur gears 111, sprockets 113 arranged in coaxial relation to the respective gears 112, endless chains 114 each passing between the sprockets 113, and drive units 115 each provided at the chain 114. The gears 112 and sprockets 113 are attached to the columns by any suitable means. With this arrangement, the chains 114 are moved in directions shown by a double-headed arrow by means of the drive units 115, so that the operating bars 102 are vertically moved through the sprockets 113, the gears 112 and the spur gears 111.

In operation, the drive units 115 are first operated to rotate the chains 14 in the directions of the double-headed arrow. This causes the sprockets 113 and the gears 112 to rotate in a clockwise or counterclockwise direction. At this time, meshing engagement of the gears 112 with the spur gears 111 will raise or lower the operating bars 102. Upon upward or downward movement of the operating bars 102, the pallet support pins 103 are moved laterally inwards or outwards through the inclined pins 107 while being guided by the bosses 106 of the columns 120. More specifically, when the operating bars are raised, the pallet support pins 103 projects from the columns to support the pallets thereon as shown in FIGURE 7. When the operating bars 102 are lowered, the pallet support pins 103 retreat into the columns 120 as shown in FIG. 8. In this state, the pallets are free to move vertically in the storage house.

As stated above, the pallet support pins 103 are not only guided by the bosses 106 of the columns 120, but also moved synchronously with the operating bars 102 through the inclined slots 105. This provides smooth operation of the pallets.

With reference to FIG. 9, the third embodiment of the invention will be explained below.

Reference numeral 201 designates a trailer chassis to be stored. Reference numeral 202 designates frame assembly 202 (corresponding to the structure 1 shown in FIGS. 1 through 5) to which a plurality of brackets 203 are attached on its four corners. Each bracket 203 is adapted to rotatably support a sheave 204. A hydraulic cylinder 205 is located in the frame assembly 202 and is provided with a forked end 206 having a shaft 209 and a single drive unit is composed of the hydraulic cylinder 205, the fork end 206 and the shaft 209. A wire 207 is attached one end to the shaft 209 and the other end to a pallet 208. (For the purpose of simplicity only one pallet is shown in FIG. 9)

One end of each of wires 207, 207-1, 207-2 and 207-3 is attached respectively to four corners of the pallet 208. The other end of each of the wires 207, 207-1, 207-2 and 207-3 is attached to the shaft 209 of the forked end 206 through the sheaves 204 supported by the brackets 203.

Reference is made in more detail to the running of the wires.

The wire 207 is attached one end to a pallet hole 208$a$ and is attached the other end to the shaft 209 via the sheave 204.

The wire 207-1 is attached one end to a pallet hole 208$b$ and is attached the other end to the shaft 209 via sheaves 204-1 and 204-2.

The wire 207-2 is attached one end to a pallet hole 208$c$ and is attached the other end to the shaft 209 via sheaves 204-3 and 204-4.

The wire 207-3 is attached one end to a pallet hole 208$d$ and is attached the other end to the shaft 209 via sheaves 204-5 and 204-6.

As shown in FIG. 9, the above sheaves 204-2, 204-4, 204-6 are arranged above the hydraulic cylinder 205 and the forked end 206.

Thus, loads are accommodated equally by the four wires which are supported by the single hydraulic cylinder 205 via the forked end 206, and also a plurality of wires 207, 207-1, 207-2 and 207-3 are simultaneously moved to lift the pallet 208 by the actuation of the single hydraulic cylinder 205.

While specific constructions and modifications have been described and illustrated herein, it is obvious that other alternate constructions and modifications can be made by one skilled in the art without departing from the invention. Accordingly, the invention is to be limited only in accordance with the appended claims.

What is claimed is:

1. A first-in, last-out type chassis storing device comprising:
    a multi-level substantially vertical ascent-and-descent pallet storage structure;
    an opening in said storage structure for allowing a chassis to be introduced therein horizontally;
    holding means at the lower part of said storage structure for holding a plurality of stacked pallets;
    a lifting unit for lifting at least one pallet within said pallet storage structure from the plurality of stacked pallets;
    a plurality of rotatable substantially vertical longitudinal support members rotatably attached to said pallet storage structure;
    a plurality of pallet support elements attached to and longitudinally spaced along each one of said plurality of longitudinal support members for rotation therewith for rotatably engaging and supporting a pallet;
    a plurality of rotatable and vertically movable guide members rotatably and movably attached to said pallet storage structure;
    a plurality of pallet hooks attached to and longitudinally spaced along each one of said plurality of rotatable and movable guide members for rotation and movement therewith for engaging and supporting a pallet;
    a drive means for rotating said plurality of longitudinal support members for engaging said plurality of pallet support elements with a pallet and for rotating and vertically moving said plurality of guide members for engaging said plurality of hooks with a pallet and for vertically moving a pallet engaged with said plurality of hooks; and
    said lifting unit lifting at least one pallet from the plurality of stacked pallets, said drive means rotating said longitudinal support members in a first direction for rotating said plurality of pallet support elements for bringing pallet support elements into engagement with for supporting the at least one pallet on said lifting unit, said drive means further lowering and then rotating said plurality of guide members for rotating said plurality of pallet hooks for engaging pallet hooks with and for supporting the pallet engaged and supported by pallet support elements on said longitudinal support members, said drive means then rotating said longitudinal support members in a direction opposite to the first said direction for disengaging the pallet support elements from the at least one pallet engaged with and supported by the pallet hooks and palet support elements, said drive means then vertically moving said plurality of guide members for raising the at least one pallet engaged and supported by the pallet hooks on said plurality of guide members into a storage position, and when a pallet is to be removed from a storage position the above functions are carried out in reverse order.

2. A device as in claim 1, wherein said drive means includes only a single drive unit, said single drive unit has means for directly imparting linear motion, a plurality of cable means attaching each one of said guide members to said linear motion means of said drive unit, and a sheave attached to said storage structure for each one of said plurality of cable means for smoothly guiding said cable means from said single drive unit to each one of said plurality of guide members.

3. A device as in claim 2, wherein each of said plurality of guide members is a cable member.

* * * * *